No. 755,192. PATENTED MAR. 22, 1904.
T. L. VALERIUS.
SELF FILLING HEATER OR COOLER.
APPLICATION FILED JAN. 24, 1903.
NO MODEL. 2 SHEETS—SHEET 2.
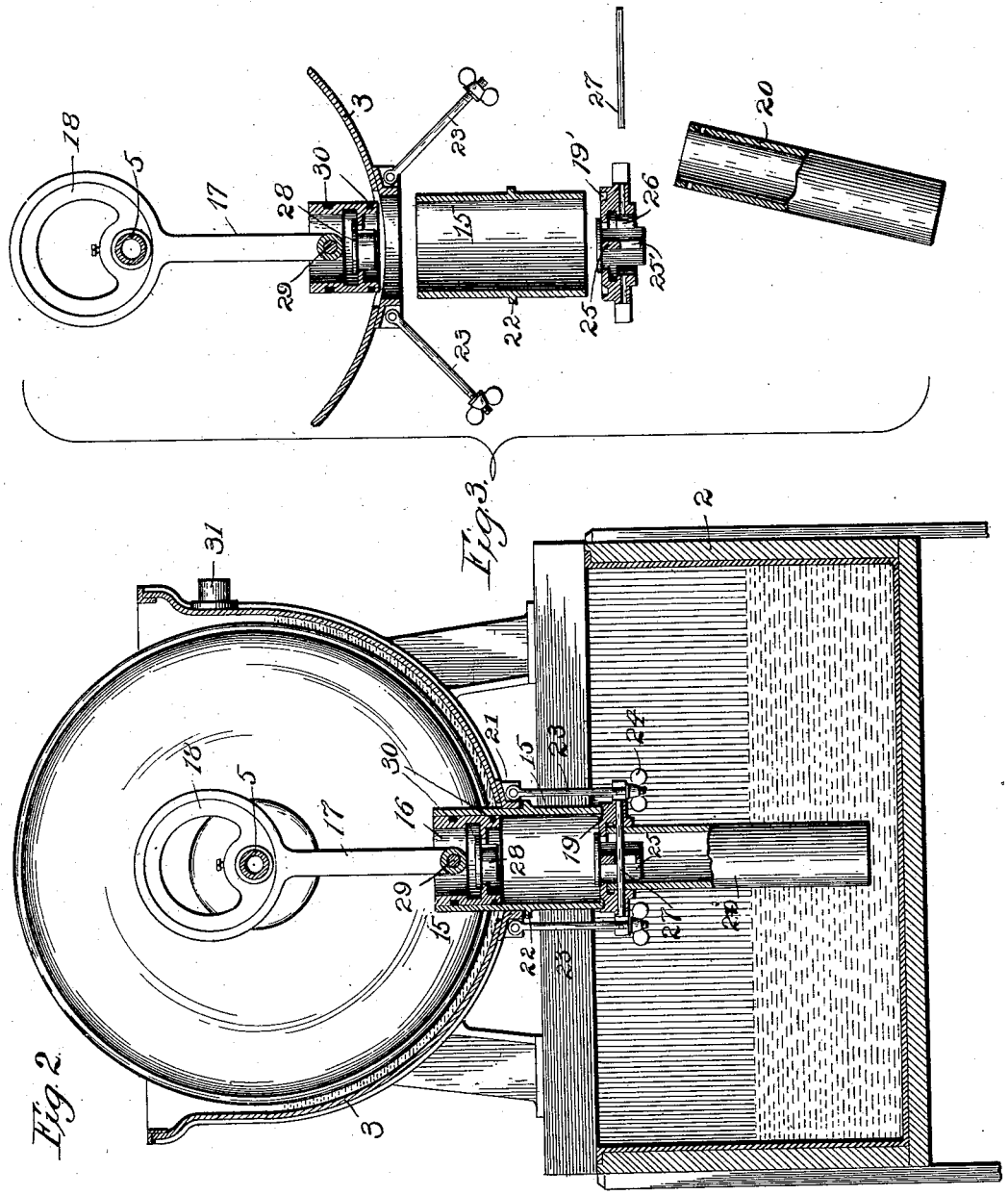
Witnesses:
Inventor:
Theodore L. Valerius,
By C. P. Hawley, Att'y No. 755,192.

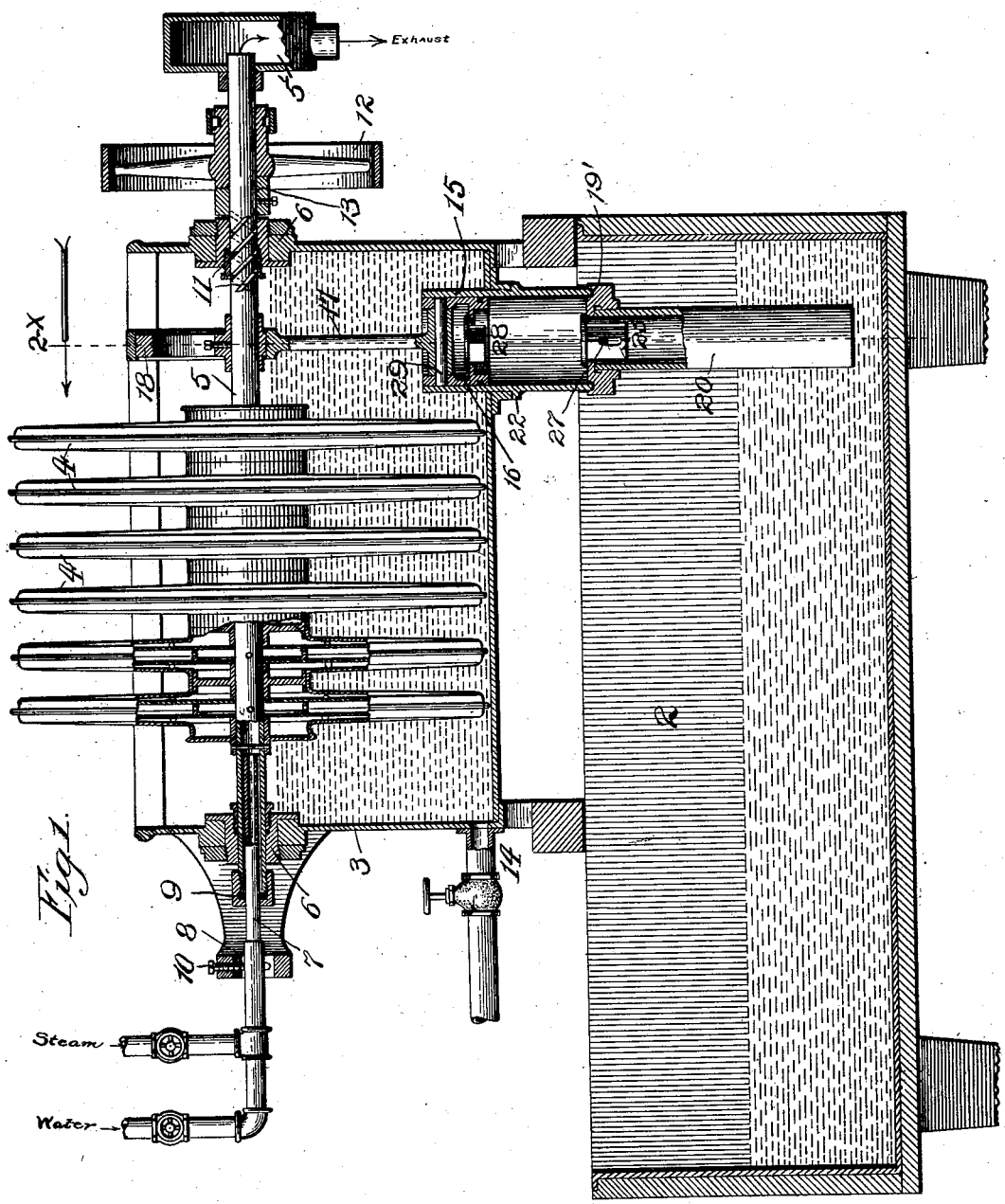

Patented March 22, 1904.

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

SELF-FILLING HEATER OR COOLER.

SPECIFICATION forming part of Letters Patent No. 755,192, dated March 22, 1904.

Application filed January 24, 1903. Serial No. 140,397. (No model.)

*To all whom it may concern:*

Be it known that I, THEODORE L. VALERIUS, a citizen of the United States, residing at Fort Atkinson, Jefferson county, Wisconsin, have invented certain new and useful Improvements in Self-Filling Heaters or Coolers, of which the following is a specification.

My invention relates to means for heating or cooling milk, cream, and like liquid substances; and the object of my invention is to provide a small self-contained machine that shall be adapted to draw its supply of fluid from a vat or reservoir, heat or cool the fluid, and discharge the same in its finished state.

The particular object of my invention is to provide a light compact machine of large capacity that shall be closely connected with the supply-reservoir, which will pump its own supply of liquid, and every part of which may be easily reached and cleaned. The particular duty of such a machine in a creamery is to heat or temper the milk from the receiving-vat before the milk passes to the separator. It is customary to arrange the milk-heater between the milk-vat and the separator, connecting them by long pipes, and to employ a special pump for forcing or raising the milk from the vat to the heater. It is well known that unless these pipes and all parts of the connected system are thoroughly and frequently cleaned the milk which passes through the same suffers in quality. The complicated pipe connections between the vat and the separator are difficult to dismember, and therefore most butter-makers content themselves with pumping water through the same once or twice a day. In consequence whole batches of milk and cream are frequently tainted by stale and sour milk and growths that find lodgment in the pipes, joints, &c. It is therefore particularly desirable that pumping and heating means be provided in such form that all parts shall be accessible for cleaning, as well as that they be effective in operation.

My invention consists generally in a heater or cooler provided with a rotary part and adapted to be placed close over the liquid vat or reservoir in combination with a pumping device located within the vat of the heater or cooler and operated by said rotary part, a suitable connection depending from said device into said reservoir; and, further, my invention consists in various constructions and in combinations of parts, all as hereinafter described, and particularly pointed out in the claims.

The invention will be more readily understood by reference to the accompanying drawings, in which—

Figure 1 is a vertical longitudinal section of the apparatus embodying my invention. Fig. 2 is a transverse vertical section on the line $2^\times$ of Fig. 1, and Fig. 3 is a sectional detail upon said line $2^\times$ and showing the pump dismembered.

In the drawings, 2 represents the milk or cream vat, usually the receiving-vat in a creamery or dairy station. The vat 3 is shown in transverse section, while the heater above it is shown in longitudinal section. Said heater comprises the tank or vat 3 and the rotary heating-disks 4, arranged upon the horizontal shaft 5. This shaft is provided with bearings 6 6 in the ends of the vat 3. It receives either steam or water, or both, from the stationary sleeve 7, that is held in the bracket 8 upon the end of the vat 3.

9 is a stuffing-box upon the end of the shaft 5 surounding the sleeve 7. Said sleeve or pipe 7 is centered in the bracket 8 by means of the set-screws 10 therein. The heating or cooling fluid which enters the shaft through the sleeve 7 and which traverses the several tempering-disks 4 drains through the opposite end of the shaft into the drain-head 5', that is stationary at the end of the shaft. The parts of the shaft that run in the bearings 6 are preferably provided with spiral grooves 11, winding in an opposite direction to the rotation of the shaft and adapted to conduct the moisture collected upon the shaft at the bearings through said bearings and discharge the same outside of the vat 3. In this manner I prevent the pollution of the milk in the heater-vat by the impurities that might otherwise drip from the bearings.

12 represents the driving-pulley, that is connected with the shaft by means of the clutch 13, for driving or rotating the disks 4, that are located on said shaft. The row of heating-disks is arranged nearer one end of the vat than the other to allow room for the pumping device within the end of the vat.

14 represents the valved outlet of the vat, this being arranged in the same end of the vat as the steam or hot-water inlet of the rotary heater-shaft 5. The pumping device is in the opposite end of the vat, and as the disks decrease in temperature with distance from the inlet to the shaft 5 the milk or cream that is raised into the vat by the pump will first be effected by the coolest of the disks, after which in flowing toward the outlet 14 the milk will be gradually raised in temperature until the temperature of the hottest disk is approximated in the milk.

The pumping device comprises the cylinder 15, the piston 16, the eccentric-rod 17, the eccentric 18, the valve-plate or cylinder-head 19, and the intake-pipe 20.

The bottom of the vat 3 is provided with a boss 21, that is riveted thereto and which is bored out to snugly fit the cylinder 15. The cylinder is slipped up through this boss into the vat and is provided with a stop-rib 22, that engages the boss. The valve-plate 19 is supported by the bolts 23, that are provided on the boss 21 and which have thumb-nuts 24 on their lower ends, by which the plate 19 may be pressed against the lower end of the cylinder. As shown, the plate 19 is provided with a groove or seat 19', in which the lower end of the cylinder fits. Beneath the valve 25 in the plate 19 is a cavity 26, that is large enough to admit the upper end of the intake-pipe 20, which fits snugly therein. The pipe is secured in place by a pin 27, that is held by the bolts 23 when in position and which serves as a stop to limit the upward movement of the valve 25, the guide-wings of which are provided with a limiting-slot 25'. As shown, the piston is hollow, and in the diaphragm thereof is a metal valve 28, similar to the valve 25. The upward movement of this valve is limited by the wrist-pin 29 of the piston. This wrist-pin is so made that it may be easily removed. The piston is provided with packing-rings 30, which adapt the pump for raising either hot or cold milk. The eccentric 18 is fastened upon the shaft 5 and need not be moved at any time. The most convenient and also the novel placing of the heater directly upon and above the milk-vat allows the employment of a very short intake-pipe and at the same time leaves all parts freely accessible beneath the heater.

The pumping device may be very quickly dismembered, as indicated in Fig. 3 of the drawings, making it possible to cleanse the same in a few minutes. The size of the pump is proportioned to the heating capacity of the rotary disks, and by its means the heater is automatically supplied with liquid without recourse to a separate source of supply or power.

The operation of my device is as follows: The vat 2 having been filled with milk or other liquid, the steam or hot water, or both, valves are opened to admit the heating fluid to the rotary disks. Said disks are then set into rotation, simultaneously wherewith the operation of the pump begins. The action of the pump quickly raises the milk from the vat 2 and fills the heater-vat 3 to a proper level. After the milk first pumped into the vat has been partially heated the operator will open the valve in the outlet-pipe 14 and allow the liquid to leave the heater as rapidly as fresh liquid is supplied by the automatic pump. During the first few minutes and before the outlet is opened or throughout the operation the liquid may rise nearly to the top of the heater-vat, and as it is not desirable to allow any milk to escape through the outlet until it has been thoroughly heated and as the pump will be in full operation the milk will overflow from the heater-vat for a portion of the time and will fall through the overflow-nipple 31 into the vat 2. This will cease as soon as the outlet-valve is opened; but the advantage of thus easily disposing of the overflow milk during the first stages of the operation will be evident.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. The combination, of the vat or reservoir, with a pump arranged therein for supplying liquid to the reservoir, a rotary heating or cooling member, and means connecting said rotary member with the pump for operating the same; substantially as described.

2. The combination, of the stationary vat, with the pump, having its cylinder fixed in the walls of the vat, the movable heating or cooling member in said vat, and means in connection therewith for operating the pump to supply liquid to the reservoir; substantially as described.

3. In a heater or cooler, the combination, of a vat or reservoir, with the rotary heating or cooling member therein, the shaft of said member, a suitable pump, and a pump-rod arranged upon said shaft within said reservoir; substantially as described.

4. In a heater or cooler, the combination, of the vat or reservoir, with the rotary member therein, having a rotating shaft, the pump-cylinder located in the walls of said reservoir, the pump connected with and operated from said shaft, and a suitable intake connected with said cylinder; substantially as described.

5. In a heater or cooler, the combination, of a vat or reservoir, provided with an outlet in one end and a pump in the other, and the rotary heating or cooling member located in the vat between said outlet and pump; substantially as described.

6. In a heater or cooler, the combination, of a vat or reservoir, provided with an outlet in one end and a pump in the other, and the rotary heating or cooling member located in the vat between said outlet and pump, and means for supplying tempering fluid to said member, and causing the same to flow therethrough toward the end of the vat which contains the pump; substantially as described.

7. In a device of the class described, the combination, of the vat or reservoir, provided with an outlet at one end, with a pump-cylinder entering the other end of the vat, an intake therefor, the piston in said cylinder, the rotary heating and cooling member, a rotary shaft in said vat or reservoir, and means thereon within the vat for operating said piston during the rotation of said member; substantially as described.

8. In a device of the class described, the combination, of the vat or reservoir, with the fluid-conducting shaft therein, the rotary heating or cooling member comprising a plurality of hollow disks upon said shaft, the outlet for the vat, the pump arranged between the opposite end of the vat and the first disk of said member, a cam upon said shaft, and a pump-rod thereon for operating said pump; substantially as described.

9. In a device of the class described, the combination, of the vat or reservoir, with the rotary shaft therein, the rotary member on said shaft, bearings for the shaft in the walls of said vat, and said shaft having a spiral groove within said bearings for discharging impure collections; substantially as described.

10. In a device of the class described, the combination, of the vat or reservoir, with the moving member therein, the pump-cylinder detachably secured in the bottom of said reservoir, the pump-piston operated with said member, the intake-pipe, and the valved head of the cylinder wherein said pipe is secured, and means for forcing said head toward the vat to seat the head upon the lower end of the cylinder; substantially as described.

11. The combination, of the milk or cream vat 2, with the milk-tempering reservoir arranged above said vat, the tempering member in said reservoir, the pump-cylinder extending into the bottom of said reservoir, the valved piston operated with said member, and the valved intake of the cylinder, depending into said vat 2; substantially as described.

12. The combination, of the tempering vat or reservoir, with the boss on the bottom thereof, the pump-cylinder fitting said boss and seated against the same, the adjustable lower head of said cylinder hung from the bottom of said reservoir, the valve therein, an intake-pipe connected therewith, the valved pump-piston, and the valve-rod extending upward therefrom, into the reservoir for operation with the tempering member therein; substantially as described.

13. The combination, of the reservoir-bottom, with the internally and externally finished tubular cylinder 15, fitting and opening in said bottom, the supporting-bolts 23, the valved cylinder-head detachably supported thereby, the intake-pipe detachably supported in said head, the piston, the valve therein, a piston-operating rod 17, and its wrist-pin in said piston; substantially as described.

14. The combination, with the milk or cream vat 2 of the tempering-reservoir raised above the same, and provided with an overflow, adapted to discharge into said vat, the rotary or movable member in said tempering-reservoir, means for operating the same, the pump-cylinder, an intake hanging from said reservoir, to conduct liquid from the vat to the reservoir, the valve of said cylinder, and the valved piston operated from within the reservoir with said member; substantially as described.

15. The milk or cream vat 2, in combination with the milk-heater located above the same, and provided with its own pump for raising milk or cream from said vat; substantially as described.

16. The combination, of the milk or cream vat 2, with the heater arranged above the vat, means for elevating milk or cream thereto from the vat, the outlet of said heater, and the overflow thereof adapted to discharge into said vat 2; substantially as described.

17. In a heater or cooler, the combination, of the vat or reservoir, with the rotary tempering member therein, the shaft of said member for conducting the tempering fluid to said member, the fluid connection 7, and a rigid part thereon wherein the part 7 is adjustably held; substantially as described.

18. The combination, of the vat or reservoir, with the tempering member therein, the pump-cylinder rising through the bottom of said reservoir, and having a suitably-valved intake, and the piston in said cylinder operated with said member; substantially as described.

In testimony whereof I have hereunto set my hand, this 19th day of January, 1903, in the presence of two witnesses.

THEODORE L. VALERIUS.

Witnesses:
H. H. CURTIS,
W. W. CORNISH.